United States Patent
Unsal et al.

(10) Patent No.: US 10,725,896 B2
(45) Date of Patent: Jul. 28, 2020

(54) SYSTEM AND METHOD FOR IDENTIFYING A SUBSET OF TOTAL HISTORICAL USERS OF A DOCUMENT PREPARATION SYSTEM TO REPRESENT A FULL SET OF TEST SCENARIOS BASED ON CODE COVERAGE

(71) Applicant: Intuit Inc., Mountain View, CA (US)

(72) Inventors: Cem Unsal, Alameda, CA (US); David A. Hanekamp, Jr., Carlsbad, CA (US); Saneesh Joseph, San Diego, CA (US); Steven Atkinson, San Diego, CA (US); Michael A. Artamonov, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 256 days.

(21) Appl. No.: 15/855,773

(22) Filed: Dec. 27, 2017

(65) Prior Publication Data

US 2018/0121337 A1    May 3, 2018

Related U.S. Application Data

(63) Continuation-in-part of application No. 15/796,419, filed on Oct. 27, 2017, which is a continuation-in-part
(Continued)

(51) Int. Cl.
*G06F 17/00* (2019.01)
*G06F 11/36* (2006.01)
(Continued)

(52) U.S. Cl.
CPC ........ *G06F 11/3684* (2013.01); *G06F 11/364* (2013.01); *G06F 11/3688* (2013.01);
(Continued)

(58) Field of Classification Search
CPC .................................................. G06F 11/3438
See application file for complete search history.

(56) References Cited

U.S. PATENT DOCUMENTS 6,912,536 B1 *  6/2005  Ochitani ............... G06F 16/313
                                                          707/737
7,092,922 B2     8/2006  Meng et al.
(Continued)

FOREIGN PATENT DOCUMENTS

| JP | 2013-164740 | 8/2013 |
| KR | 10-1585029 | 1/2016 |
| WO | WO 2009-061917 | 5/2009 |

OTHER PUBLICATIONS

Wang et al., "Action Prediction and Identification From Mining Temporal User Behaviors," WSDM'11, Feb. 9-12, 2011, Hong Kong, China, Copyright 2011 ACM, p. 435-444. (Year: 2011).*
(Continued)

*Primary Examiner* — Amelia L Tapp
(74) *Attorney, Agent, or Firm* — Paradice and Li LLP

(57) ABSTRACT

A method and system generate sample data set for efficiently and accurately testing a new calculation for preparing a portion of an electronic document for users of an electronic document preparation system. The method and system receive the new calculation and gather historical use data related to previously prepared electronic documents for a large number of historical users. The method and system group the historical users into groups based on which sections of a previous version of electronic document preparation software were executed for each historical user in preparing electronic documents for the historical users. The groups are then sampled by selecting a small number of historical users from each group.

58 Claims, 6 Drawing Sheets

Related U.S. Application Data of application No. 15/292,510, filed on Oct. 13, 2016, now Pat. No. 10,140,277.

(60) Provisional application No. 62/362,688, filed on Jul. 15, 2016.

(51) Int. Cl.
    *G06N 20/00* (2019.01)
    *G06N 5/02* (2006.01)
    *G06Q 40/00* (2012.01)

(52) U.S. Cl.
    CPC ............ *G06N 20/00* (2019.01); *G06N 5/025* (2013.01); *G06Q 40/123* (2013.12)

(56) References Cited

U.S. PATENT DOCUMENTS

| | | | |
|---|---|---|---|
| 7,234,103 | B1 | 6/2007 | Regan |
| 7,251,781 | B2 | 7/2007 | Batchilo et al. |
| 7,254,569 | B2 | 8/2007 | Goodman et al. |
| 7,343,551 | B1 | 3/2008 | Bourdev |
| 7,500,178 | B1 | 3/2009 | O'Donnell |
| 7,561,734 | B1 | 7/2009 | Wnek |
| 7,765,097 | B1 | 7/2010 | Yu et al. |
| 8,032,822 | B1 | 10/2011 | Artamonov et al. |
| 8,082,144 | B1 | 12/2011 | Brown et al. |
| 8,214,362 | B1 | 7/2012 | Djabarov |
| 8,370,143 | B1 | 2/2013 | Coker |
| 8,515,972 | B1 | 8/2013 | Srikrishna et al. |
| 8,606,665 | B1 | 12/2013 | Shaw |
| 8,655,695 | B1* | 2/2014 | Qu .................. G06Q 30/0251 705/14.49 |
| 8,756,489 | B2 | 6/2014 | Richardt et al. |
| 9,069,745 | B2 | 6/2015 | Jacobsen et al. |
| 9,430,453 | B1 | 8/2016 | Ho |
| 9,652,562 | B2 | 5/2017 | Barrus |
| 9,892,106 | B1 | 2/2018 | Lesner et al. |
| 2002/0083068 | A1 | 6/2002 | Quass et al. |
| 2003/0026459 | A1 | 2/2003 | Won et al. |
| 2003/0233296 | A1 | 12/2003 | Wagner |
| 2004/0030540 | A1 | 2/2004 | Ovil et al. |
| 2004/0039988 | A1 | 2/2004 | Lee et al. |
| 2005/0108406 | A1* | 5/2005 | Lee .................. G06F 16/9535 709/228 |
| 2005/0108630 | A1 | 5/2005 | Wasson et al. |
| 2005/0125746 | A1 | 6/2005 | Viola et al. |
| 2005/0235811 | A1 | 10/2005 | Dukane |
| 2005/0257148 | A1 | 11/2005 | Goodman et al. |
| 2005/0267869 | A1* | 12/2005 | Horvitz .............. G06Q 30/0256 |
| 2006/0062451 | A1 | 3/2006 | Li et al. |
| 2006/0111990 | A1 | 5/2006 | Cohen et al. |
| 2006/0155539 | A1 | 7/2006 | Chen et al. |
| 2006/0178961 | A1 | 8/2006 | Stanley et al. |
| 2006/0182554 | A1 | 8/2006 | Stoizer |
| 2006/0184870 | A1 | 8/2006 | Christen et al. |
| 2006/0235811 | A1 | 10/2006 | Fairweather |
| 2006/0242180 | A1 | 10/2006 | Graf et al. |
| 2007/0130134 | A1 | 6/2007 | Ramsey et al. |
| 2007/0299949 | A1 | 12/2007 | Macbeth et al. |
| 2008/0065634 | A1 | 3/2008 | Krinsky |
| 2008/0104506 | A1 | 5/2008 | Farzindar |
| 2008/0147528 | A1 | 6/2008 | Talan et al. |
| 2008/0154824 | A1 | 6/2008 | Weir et al. |
| 2008/0227075 | A1 | 9/2008 | Poor et al. |
| 2008/0270110 | A1 | 10/2008 | Yurick et al. |
| 2008/0313174 | A1 | 12/2008 | Barve et al. |
| 2009/0089046 | A1 | 4/2009 | Uchimoto et al. |
| 2009/0119107 | A1 | 5/2009 | Duncan |
| 2009/0182554 | A1 | 7/2009 | Abraham et al. |
| 2009/0204881 | A1 | 8/2009 | Murthy et al. |
| 2009/0276729 | A1* | 11/2009 | Cantu-Paz ............ G06F 16/954 715/811 |
| 2009/0327513 | A1 | 12/2009 | Guo et al. |
| 2010/0005096 | A1 | 1/2010 | Minagawa et al. |
| 2011/0087671 | A1 | 4/2011 | Lee et al. |
| 2011/0258182 | A1 | 10/2011 | Singh et al. |
| 2011/0271173 | A1 | 11/2011 | Ait-Mokhtar et al. |
| 2012/0089659 | A1 | 4/2012 | Halevi et al. |
| 2012/0272160 | A1 | 10/2012 | Spivack et al. |
| 2013/0013612 | A1 | 1/2013 | Fittges et al. |
| 2014/0019433 | A1 | 1/2014 | Effrat et al. |
| 2014/0122988 | A1 | 5/2014 | Eigner et al. |
| 2014/0164352 | A1 | 6/2014 | Denninghoff |
| 2014/0173406 | A1 | 6/2014 | Robelin et al. |
| 2014/0207782 | A1 | 7/2014 | Ravid |
| 2014/0223277 | A1 | 8/2014 | Kimber et al. |
| 2014/0258825 | A1 | 9/2014 | Ghosh et al. |
| 2014/0282586 | A1 | 9/2014 | Shear et al. |
| 2015/0046785 | A1 | 2/2015 | Byron et al. |
| 2015/0095753 | A1 | 4/2015 | Gajera et al. |
| 2015/0206067 | A1 | 7/2015 | Abu-Mostafa et al. |
| 2015/0254225 | A1 | 9/2015 | Chirca |
| 2015/0309992 | A1 | 10/2015 | Visel |
| 2015/0317295 | A1 | 11/2015 | Sherry et al. |
| 2016/0019197 | A1 | 1/2016 | Iasi et al. |
| 2017/0075873 | A1 | 3/2017 | Shetty et al. |
| 2017/0220540 | A1 | 8/2017 | Wang et al. |
| 2017/0239576 | A1 | 8/2017 | Hsiao |
| 2017/0293607 | A1 | 10/2017 | Kolotienko et al. |
| 2017/0337176 | A1 | 11/2017 | Cietwierkowski et al. |
| 2018/0018310 | A1 | 1/2018 | Unsal |
| 2018/0018311 | A1 | 1/2018 | Mukherjee et al. |
| 2018/0018322 | A1 | 1/2018 | Mukherjee et al. |
| 2018/0018582 | A1 | 1/2018 | Unsal et al. |
| 2018/0018676 | A1 | 1/2018 | Mukherjee et al. |
| 2018/0018740 | A1 | 1/2018 | Unsal et al. |
| 2018/0018741 | A1 | 1/2018 | Mukherjee et al. |
| 2018/0032497 | A1 | 2/2018 | Mukherjee et al. |

OTHER PUBLICATIONS

Drummond, et al., "Examining the Impacts of Dialogue Content and System Automation on Affect Models in a Spoken Tutorial Dialogue System," Proceedings of the SIGDAL 2011: the 12th Annual Meeting of the Special interest group on Discourse and Dialogue, p. 312-318, Jun. 2011, copyright 2011 ACM. (Year: 2011).*

Middleton et al., "Capturing knowledge of User Preferences: Ontologies in Recommender Systems," K-CAP '01, p. 100-107, copyright 2001 ACM. (Year: 2001).*

Hermens, Leonard A., et al., "A Machine-Learning Apprentice for the Completion of Repetitive Forms," Feb. 1994, IEEE, pp. 28-33.

Zhang, Chi, "Genetic Programming for Symbolic Regression," 2015, University of Tennessee, Knoxville, TN 37966, USA.

Glushko, Robert J., et al., "Document Engineering for e-Business," DocEng '02, Nov. 2002, USA, copyright 2002 ACM, p. 42-48.

Research Gate, "Thread of Question and Answers on generating training set data from ResearchGate," retrieved from https://www.researchgate.net/post/How_can_I_Generate_the_training_data_From_the_dataset_of_images, Questions and answers dated Jul. 2015, p. 1-5 (Year: 2015).

Toda et al., "A Probabilistic Approach for Automatically Filling Form-Based Web Interfaces," Proceedings of the VLDB Endowment, vol. 4, No. 3, pp. 151-160, (Year: 2010).

* cited by examiner

200

| | User 1 | User 2 | User 3 | User 4 | User 5 | ... | User N-1 | User N |
|---|---|---|---|---|---|---|---|---|
| Code Section 1 | 0 | 1 | 1 | 0 | 1 | ... | 0 | 0 |
| Code Section 2 | 1 | 1 | 0 | 1 | 1 | ... | 1 | 0 |
| Code Section 3 | 1 | 0 | 0 | 1 | 0 | ... | 1 | 1 |
| Code Section 4 | 1 | 0 | 1 | 0 | 0 | ... | 1 | 0 |
| Code Section 5 | 0 | 0 | 0 | 1 | 0 | ... | 0 | 1 |
| Code Section 6 | 1 | 1 | 1 | 1 | 1 | ... | 1 | 1 |
| Code Section 7 | 1 | 0 | 0 | 0 | 0 | ... | 1 | 0 |
| Code Section 8 | 0 | 1 | 0 | 0 | 1 | ... | 0 | 0 |
| ⋮ | ⋮ | ⋮ | ⋮ | ⋮ | ⋮ | | ⋮ | ⋮ |
| Code Section M-1 | 0 | 1 | 0 | 1 | 1 | ... | 0 | 1 |
| Code Section M | 0 | 0 | 1 | 0 | 0 | ... | 0 | 1 |

| | User 1 | User 2 | User 3 | User 4 | User 5 | ... | User N-1 | User N |
|---|---|---|---|---|---|---|---|---|
| Code Line 1 | 0 | 1 | 0 | 0 | 1 | ... | 0 | 1 |
| Code Line 2 | 0 | 0 | 1 | 1 | 1 | ... | 1 | 1 |
| Code Line 3 | 1 | 1 | 0 | 1 | 0 | ... | 0 | 0 |
| Code Line 4 | 0 | 0 | 1 | 0 | 1 | ... | 1 | 1 |
| Code Line 5 | 1 | 0 | 0 | 1 | 0 | ... | 0 | 0 |
| Code Line 6 | 1 | 1 | 1 | 0 | 1 | ... | 1 | 1 |
| Code Line 7 | 1 | 0 | 1 | 1 | 0 | ... | 1 | 0 |
| Code Line 8 | 0 | 1 | 0 | 0 | 1 | ... | 0 | 1 |
| ⋮ | ⋮ | ⋮ | ⋮ | ⋮ | ⋮ | | ⋮ | ⋮ |
| Code Line M-1 | 1 | 1 | 0 | 1 | 1 | ... | 0 | 1 |
| Code Line M | 0 | 0 | 1 | 1 | 0 | ... | 0 | 0 |

FIG. 3

SYSTEM AND METHOD FOR IDENTIFYING A SUBSET OF TOTAL HISTORICAL USERS OF A DOCUMENT PREPARATION SYSTEM TO REPRESENT A FULL SET OF TEST SCENARIOS BASED ON CODE COVERAGE

CROSS-REFERENCE TO RELATED APPLICATIONS

The present application is a continuation in part of U.S. patent application Ser. No. 15/796,419, filed Oct. 27, 2017, and titled SYSTEM AND METHOD FOR IDENTIFYING A SUBSET OF TOTAL HISTORICAL USERS OF A DOCUMENT PREPARATION SYSTEM TO REPRESENT A FULL SET OF TEST SCENARIOS BASED ON STATISTICAL ANALYSIS. U.S. patent application Ser. No. 15/796,419 is a continuation in part of U.S. patent application Ser. No. 15/292,510, filed Oct. 13, 2016, and titled SYSTEM AND METHOD FOR SELECTING DATA SAMPLE GROUPS FOR MACHINE LEARNING OF CONTEXT OF DATA FIELDS FOR VARIOUS DOCUMENT TYPES AND/OR FOR TEST DATA GENERATION FOR QUALITY ASSURANCE SYSTEMS. U.S. patent application Ser. No. 15/292,510 claims priority benefit from U.S. Provisional Patent Application No. 62/362,688, filed Jul. 15, 2016, and titled SYSTEM AND METHOD FOR MACHINE LEARNING OF CONTEXT OF LINE INSTRUCTIONS FOR VARIOUS DOCUMENT TYPES. U.S. patent application Ser. Nos. 15/796,419 and 15/292,510, and U.S. Provisional Patent Application No. 62/362,688 are incorporated herein by reference in their entireties.

BACKGROUND

Many people use electronic document preparation systems to help prepare important documents electronically. For example, each year millions of people use tax return preparation systems to help prepare and file their tax returns. Typically, tax return preparation systems receive tax related information from a user and then automatically populate the various fields in electronic versions of government tax forms. Tax return preparation systems represent a potentially flexible, highly accessible, and affordable source of tax return preparation assistance for customers.

The processes that enable the electronic tax return preparation systems to prepare tax returns for users are highly complex and often utilize large amounts of human and computing resources. To reduce the usage of computing and human resources, new tax return preparation processes are continually being developed. Of course, before the new tax return preparation processes can be implemented, they must be thoroughly tested to ensure that they properly calculate data values for tax returns. However, testing the new processes with a very large number of previous tax filers results in a very high use of computing and human resources in the testing process. On the other hand, testing the new processes with a smaller random sample of previous tax filers is often inadequate, as less common tax filer attributes will likely not appear in the sample set. If the new processes are not tested to ensure that the processes can accurately handle tax filers with uncommon attributes, then flaws in the new processes will likely go undetected. This results in the tax return preparation system failing to properly prepare the tax returns for many users.

In addition, lengthy and resource intensive testing processes can lead to delays in releasing an updated version of the electronic tax return preparation system as well as considerable expense. This expense is then passed on to customers of the electronic tax return preparation system. These expenses, delays, and possible inaccuracies often have an adverse impact on traditional electronic tax return preparation systems.

These issues and drawbacks are not limited to electronic tax return preparation systems. Any electronic document preparation system that assists users to electronically fill out forms or prepare documents can suffer from these drawbacks when new processes are developed for preparing the documents.

What is needed is a method and system that provides a technical solution to the technical problem of generating sample data sets that are likely to cover many use cases while efficiently using resources.

SUMMARY

Embodiments of the present disclosure provide one or more technical solutions to the technical problem of electronic document preparation systems that are not able to generate sample data sets that will cover all, or most, use cases while efficiently using resources. The technical solutions include generating training sets for testing new calculations or processes for an electronic document preparation system with very small sample sizes that, nevertheless, result in representation of a large segment of possible users. The training set data is generated by executing a previous version of software code associated with the electronic document preparation system for historical user data related a large number of historical users of the electronic document preparation system and grouping the historical users based on the combinations of sections of the previous version of the code that were executed for the historical users. The training set data is generated by sampling one or more historical users from each group. Because each group represents a unique combination of sections of the prior code, sampling a small number of historical users from each group will result in a training set that covers virtually all combinations of user attributes.

Embodiments of the present disclosure overcome the drawbacks of traditional electronic document preparation systems that generate training set data by taking a random sample of the entire group of historical users, resulting in the high likelihood that historical users with very rare combinations of attributes will not be present in the training set data. Embodiments of the present disclosure also overcome the drawbacks of traditional electronic document preparation systems that generate training set data including a very large number of historical users in order to increase the likelihood that historical users with rare attributes will be represented. Embodiments of the present disclosure overcome these drawbacks by providing a very small sample of historical users that will include all types of historical users based on analysis of previous versions of software code executed from the historical users.

BRIEF DESCRIPTION OF THE DRAWINGS

FIG. 2 is a code coverage table for generating efficient training sets for testing new processes for preparing electronic documents for users of an electronic document preparation system, in accordance with one embodiment.

FIG. 3 is a code coverage table for generating efficient training sets for testing new processes for preparing electronic documents for users of an electronic document preparation system, in accordance with one embodiment.

Figure 1:
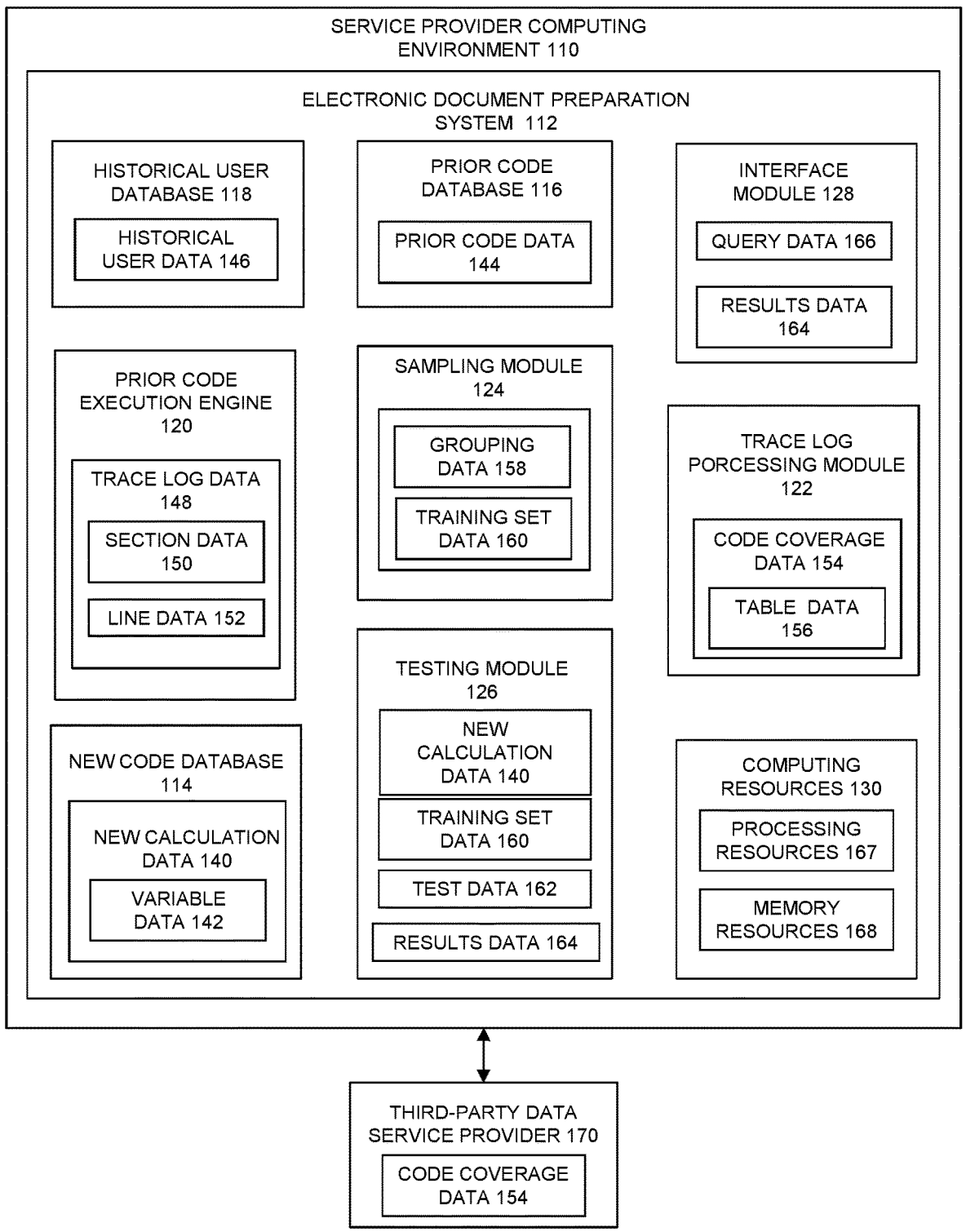
FIG. 1 is a block diagram of software architecture for generating efficient training sets for testing new processes for preparing electronic documents for users of an electronic document preparation system, in accordance with one embodiment.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments. Embodiments may be implemented in many different forms and should not be construed as limited to the embodiments set forth herein, shown in the FIGs, and described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually connected, physically connected, or otherwise associated with one another, to provide the production environment implementing the application.

As specific illustrative examples, the assets making up a given production environment can include, but are not limited to, one or more computing environments used to implement the application in the production environment such as one or more of a data center, a cloud computing environment, a dedicated hosting environment, and other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control one or more assets or components of the production environment; one or more communications channels for sending and receiving data used to implement the application in the production environment; one or more access control systems for limiting access to various components of the production environment, such as firewalls and gateways; one or more traffic or routing systems used to direct, control, or buffer, data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; or any other assets/components making up an actual production environment in which an application is deployed, implemented, accessed, and run, e.g., operated, as discussed herein, or as known in the art at the time of filing, or as developed after the time of filing.

As used herein, the term "historical user data" refers to data that has been stripped of all data, such as Personal Identification Data (PID), that could identify any individual. Accordingly, the historical user data is data that has been sanitized by removing any data that could be used to identify any individual user, directly or indirectly, or that could be used to access a historical user's data or accounts, or otherwise reveal personal information about a specific individual. Furthermore, historical user data is used only for testing document preparation systems, such as testing tax return preparation systems.

As used herein, the terms "computing system", "computing device", and "computing entity", include, but are not limited to, a virtual asset; a server computing system; a workstation; a desktop computing system; a mobile computing system, including, but not limited to, smart phones, portable devices, or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes or operations as described herein.

As used herein, the term "computing environment" includes, but is not limited to, a logical or physical grouping of connected or networked computing systems or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate an application.

In various embodiments, one or more cloud computing environments are used to create, deploy, or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, or as known in the art at the time of filing, or as developed after the time of filing.

In many cases, a given application or service may utilize, and interface with, multiple cloud computing environments, such as multiple VPCs, in the course of being created, deployed, or operated.

As used herein, the term "virtual asset" includes any virtualized entity or resource or virtualized part of an actual "bare metal" entity. In various embodiments, the virtual assets can be, but are not limited to, virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through, a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing, can be implemented as one or more virtual assets.

In one embodiment, two or more assets, such as computing systems or virtual assets, two or more computing environments, are connected by one or more communications channels including but not limited to, Secure Sockets Layer communications channels and various other secure communications channels, or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, or users and another set or group of information, data, or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed electronic document preparation system determines a relationship between a first group of data and a second group of data, then a characteristic or subset of a first group of data can be related to, associated with, or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

In one embodiment, the electronic document preparation system generates grouping data based on an analysis of how previous versions of software code were executed for each historical user. The electronic document preparation system executes prior code data for each historical user. The prior code data corresponds to a previous calculation used by the electronic document preparation system for generating the data values that will be generated by the new calculation data to be tested. When the electronic document preparation system executes the prior code data for each historical user, the electronic document preparation system generates trace log data that indicates which sections of the previous code were executed for each historical user. The electronic document preparation system executes, for each historical user, only certain portions of the prior code data based on the attributes of the historical user. Other portions of the prior code data are not executed based on the attributes of the historical user. Historical users with similar attributes results in the execution of similar sections of the prior code data. The electronic document preparation system generates the grouping data by grouping the users based on which sections of the prior code data were executed for those users. The electronic document preparation system selects the groups such that the combination of groups represents execution of all sections of the prior code data. Sampling a small number of historical users from each group will therefore result in a training set that covers virtually the entire range of historical users.

In one embodiment, the electronic document preparation system is a tax return preparation system. The historical user data corresponds to previously prepared tax returns for a large number of historical users of the tax return preparation system. The new calculation data to be tested corresponds to a calculation for populating a tax related form associated with preparing a tax return. The variables associated with the calculation can include tax related attributes such as, but not limited to, home ownership status, marital status, W-2 income, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits or any other variable of interest and/or as discussed herein, known in the art, or as becomes known/available after the time of filing. In one embodiment, the tax return preparation system generates grouping data based on the data values that the historical users have for the various tax related variables. In particular, in one embodiment, the tax return preparation system generates grouping data based on the combinations of data values that the historical users have for the tax related variables. Additionally, or alternatively, the tax return preparation system generates the grouping data based on how a previous or existing version of the tax return preparation system executed software instructions related to the calculation for each of the historical users based on the attributes of the historical users.

In one embodiment, the electronic document preparation system includes a financial document preparation system other than a tax return preparation system.

Embodiments of the present disclosure address some of the shortcomings associated with traditional electronic document preparation systems that generate training sets that are highly inefficient and inaccurate. An electronic document preparation system in accordance with one or more embodiments provides training sets that are very small in size and that nevertheless provide for accurate testing because they cover virtually the entire range of historical users. The various embodiments of the disclosure can be implemented to improve the technical fields of data processing, electronic document preparation, data transmission, data analysis, and data collection. Therefore, the various described embodiments of the disclosure and their associated benefits amount to significantly more than an abstract idea. In particular, by generating efficient training sets for testing new processes for preparing electronic documents for users of an electronic document preparation system, the electronic document preparation system can learn and incorporate new forms more efficiently.

Using the disclosed embodiments of a method and system for generating efficient training sets for testing new processes for preparing electronic documents for users of an electronic document preparation system, a method and system for generating efficient training sets for testing new processes for preparing electronic documents for users of an electronic document preparation system more accurately is provided. Therefore, the disclosed embodiments provide a technical solution to the long standing technical problem of efficiently and accurately testing new calculations or processes in an electronic document preparation system.

The disclosed embodiments of a method and system for generating efficient training sets for testing new processes for preparing electronic documents for users of an electronic document preparation system are also capable of dynamically adapting to constantly changing fields such as tax return preparation and other kinds of document preparation. Consequently, the disclosed embodiments of a method and system for generating efficient training sets for testing new processes for preparing electronic documents for users of an electronic document preparation system also provide a technical solution to the long standing technical problem of static and inflexible electronic document preparation systems.

The result is a much more accurate, adaptable, and robust method and system for generating efficient training sets for testing new processes for preparing electronic documents for users of an electronic document preparation system. This, in turn, results in: less human and processor resources being dedicated to analyzing new forms because more accurate and efficient analysis methods can be implemented, i.e., usage of fewer processing resources, usage of fewer memory storage assets, and less communication bandwidth being utilized to transmit data for analysis.

The disclosed method and system for generating efficient training sets for testing new processes for preparing electronic documents for users of an electronic document preparation system does not encompass, embody, or preclude other forms of innovation in the area of electronic document preparation systems. In addition, the disclosed method and system for generating efficient training sets for testing new processes for preparing electronic documents for users of an electronic document preparation system is not related to any fundamental economic practice, fundamental data processing practice, mental steps, or pen and paper based solutions, and is, in fact, directed to providing solutions to new and existing problems associated with electronic document preparation systems. Consequently, the disclosed method and system for generating efficient training sets for testing new processes for preparing electronic documents for users of an electronic document preparation system, does not encompass, and is not merely, an abstract idea or concept.

Hardware Architecture

FIG. 1 illustrates a block diagram of a production environment 100 for generating efficient training sets for testing new processes for preparing electronic documents for users of an electronic document preparation system, according to one embodiment. Embodiments of the present disclosure provide methods and systems for generating efficient training sets for testing new processes for preparing electronic documents for users of an electronic document preparation system, according to one embodiment. Embodiments of the present disclosure receive new calculation data corresponding to a new process for generating data values to populate an electronic form for users. In order to test the new calculation data, embodiments of the present disclosure retrieve historical user data that includes data related to a large number of historical users of the electronic document preparation system. The historical users are users for whom the electronic document preparation system previously prepared an electronic document. The historical user data includes, for each historical user, the data related to the historical user that was utilized by the document preparation system to produce the electronic document for the historical user.

Embodiments of the present disclosure generate the training set data by executing a prior version of software code associated with the electronic document preparation system for the historical user data related to a large number of historical users. The sections of code executed for a historical user depend on the attributes of the historical user indicated by the historical user data. Embodiments of the present disclosure analyze the sections of the prior code that were executed for each historical user. The historical users are grouped according to the combination of sections of the software code that were executed for them. The training set data is generated by sampling one or more historical users from each group. Because each group represents a unique combination of sections of the prior code, sampling a small number of historical users from each group will result in a training set that covers virtually all combinations of historical user attributes.

Embodiments of the present disclosure then test the new calculation for each historical user from the training set. If the test indicates that the calculation is correct for the whole training set, then the calculation is deemed reliable because it has been tested for the most common and the rarest types individuals. The result is a very efficient testing process because the training set includes a small number of historical users that is highly likely to represent the entire range of historical users.

In one embodiment, the electronic document preparation system generates summary data by executing, for each historical user, prior code data corresponding to a previous version of the calculation and analyzing the actions taken in executing the prior code data for each of the historical users. The electronic document preparation system executes, for each historical user, particular lines or sections of the software code associated with the previous version of the calculation based on the attributes of the historical user. The electronic document preparation system identifies which sections of the software code were executed for the various historical users and divides them into groups such that sampling a few historical users from each group will result in a training set that represents every combination of executed portions of the software code. This ensures that the training set will include historical users with both rare and common combinations of attributes while still being relatively small in number.

The disclosed method and system for generating efficient training sets for testing new processes for preparing electronic documents for users of an electronic document preparation system provides for significant improvements to the technical fields of electronic document preparation, data processing, and data management.

The disclosed method and system for generating efficient training sets for testing new processes for preparing electronic documents for users of an electronic document preparation system provide for the processing and storing of smaller amounts of data, i.e., for the more efficient analysis of forms and data; thereby eliminating unnecessary data analysis and storage. Consequently, using the disclosed method and system for generating efficient training sets for testing new processes for preparing electronic documents for users of an electronic document preparation system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for generating efficient training sets for testing new processes for preparing electronic documents for users of an electronic document preparation system.

Referring to FIG. 1, the production environment 100 includes a service provider computing environment 110 for generating efficient training sets for testing new processes for preparing electronic documents for users of an electronic document preparation system, according to one embodiment. The service provider computing environment 110 represents one or more computing systems such as one or more servers or distribution centers that are configured to receive, execute, and host one or more electronic document preparation systems (e.g., applications) for access by one or more users, for generating efficient training sets for testing new processes for preparing electronic documents for users of an electronic document preparation system, according to one embodiment. The service provider computing environment 110 can represent a traditional data center computing environment, a virtual asset computing environment (e.g., a cloud computing environment), a hybrid between a traditional data center computing environment and a virtual asset computing environment, or other kinds of computing environments, as discussed herein, known in the art, or as become known after the time of filing, according to one embodiment.

In one embodiment, the service provider computing environment 110 includes an electronic document preparation system 112, which is configured to provide electronic document preparation services to a user.

According to one embodiment, the electronic document preparation system 112 is a system that assists in preparing financial documents related to one or more of tax return preparation, invoicing, payroll management, billing, banking, investments, loans, credit cards, real estate investments, retirement planning, bill pay, and budgeting or any other data management and form producing system as discussed herein, known in the art, or as become known after the time of filing. In one embodiment, the electronic document preparation system 112 is a standalone system that provides financial document preparation services to users. Alternatively, the electronic document preparation system 112 is integrated into other software or service products provided by a service provider.

In many situations electronic document preparation systems generate new processes for preparing electronic documents. For example, electronic document preparation systems may update the process for calculating data values for a form to improve the efficiency or accuracy of the process. If the electronic form is not correctly completed, there can be serious consequences for users. Thus, the electronic document preparation system 112, in accordance with principles of the present disclosure, advantageously generates a training set for testing the new calculation that results in an efficient and accurate testing process.

In one embodiment, the electronic document preparation system 112 gathers, retrieves, or maintains historical user data related to historical users of the electronic document preparation system 112. The historical user data corresponds to data that was utilized by the electronic document preparation system 112 in preparing electronic documents for the historical users. The historical user data can also include the previously prepared electronic documents. Thus, for each user, the historical user data includes data related to the attributes of the user relevant to the preparation of the electronic document. The historical user data is data that has been stripped of all Personal Identification Data (PID), that could identify any individual. Accordingly, the historical user data is data that has been sanitized by removing any data that could be used to identify any individual user, directly or indirectly, or that could be used to access a historical user's data or accounts, or otherwise reveal personal information about a specific individual. Furthermore, historical user data is used only for testing document preparation systems, such as testing tax return preparation systems.

In one embodiment, to prepare for testing new calculations, the electronic document preparation system 112 executes a previous version of electronic document preparation software code for each historical user based on the historical user data. The electronic document preparation system 112 executes different sections of the previous software code for historical users with different attributes. The electronic document preparation system 112 generates trace log data that indicates, for each historical user, the sections of the previous software code that were executed for the historical user.

In one embodiment, the trace log data also indicates data values that were provided or entered for certain lines or sections of code. In one embodiment, the trace log data indicates whether a particular data value is a positive number, zero, blank, or a negative number. In one embodiment, the prior software code includes lines that defines a variable as being the smaller, or minimum, of two or more other variables. The trace log data indicates which of the other variables was the minimum for each historical user. The trace log data notes these factors and these factors are used to identify unique groups of historical users for the purpose of generating training set data.

In one embodiment, the electronic document preparation system 112 receives new calculation data corresponding to a new process for calculating data values for an electronic document. The electronic document preparation system 112 retrieves portions of the trace log data associated with the new calculation. The electronic document preparation system 112 identifies, for each historical user, the sections of the previous software code executed in performing an old calculation related to the new calculation. The electronic document preparation system 112 sorts the historical users into groups based on the combinations of previous code sections executed for the historical users. Each group corresponds to a unique combination of executed sections of code. This ensures that sampling a few historical users from each group will result in the training set that includes both common and rare types of historical users. This results in sampled training set data that includes historical user data related to a relatively small number of historical users and that, nevertheless, includes historical user data with rare but important data values. In this way, when new calculation data is tested, the test data can be generated from the historical user data associated with a relatively small number of historical users.

In one embodiment, the trace log data also indicates data values that were provided or entered for certain lines or sections of code. In one embodiment, the trace log data indicates whether a particular data value is a positive number, zero, blank, or a negative number. In one embodiment, the prior software code includes lines that defines a variable as being the smaller, or minimum, of two or more other variables. The trace log data indicates which of the other variables was the minimum for each historical user. The trace log data notes these factors and these factors are used to identify unique groups of historical users for the purpose of generating training set data, in one embodiment. Accordingly, in one embodiment, the trace log data identifies not only which sections of the previous code were executed for the various historical users, but also the data values associated with various lines or sections of code.

The electronic document preparation system 112 includes a new code database 114, a prior code database 116, a historical user database 118, a prior code execution engine 120, a trace log processing module 122, a sampling module 124, a testing module 126, and an interface module 128, according to various embodiments.

In one embodiment, the electronic document preparation system 112 includes computing resources 130. The computing resources 130 include processing resources 167 and memory resources 168. The processing resources 167 include one or more processors. The memory resources 168 include one or more memories configured as computer readable media capable of storing software instructions and other data. The processing resources 167 are capable of executing software instructions stored on the computer readable media. In one embodiment, the various components, modules, databases, and engines of the electronic document preparation system 112 utilize the computing resources 130 to assist in performing their various functions. Alternatively, or additionally, the various components, modules, databases, and engines can utilize other computing resources.

In one embodiment, the new code database 114 includes new calculation data 140. The new calculation data 140 includes one or more new calculations for calculating data values associated with electronic documents to be prepared by the electronic document preparation system 112 for users. In one embodiment, the new code database 114 includes a large number of candidate new calculations for preparing various parts of an electronic document.

In one embodiment, the new calculation data 140 includes a new calculation for generating data values for a form associated with an electronic document that the electronic document preparation system 112 assists users to prepare. A single electronic document may include or utilize a large number of forms. Some of the forms may be a part of the electronic document. Other forms may be utilized by the electronic document preparation system 112 to merely assist in preparing the electronic document. For example, some forms include worksheets for generating data values utilized in another form or portion of the electronic document. In one embodiment, the new calculation data 140 includes a new calculation for generating a data value associated with a form, or for generating multiple data values or all of the data values associated with a form. Thus, a single calculation from the new calculation data 140 can correspond to a process for populating an entire form or for populating a portion of a form.

In one embodiment, the new calculation data 140 includes variable data 142. The variable data 142 corresponds to variables associated with a calculation. In one example, the new calculation data 140 includes a calculation for generating a particular data value for a particular form. In one embodiment, the calculation includes multiple variables that correspond to data values or attributes associated with the user that are collected from the user as part of an electronic document preparation interview. In another example, the new calculation data 140 includes a calculation for populating many data fields of a form. In one embodiment, the variable data 142 includes all of the variables associated with all the data fields of the form.

In one embodiment, the variable data 142 related to a particular calculation includes many kinds of variables. In one embodiment, the variables include answers to yes or no questions, monetary values that fall within a large range, nonmonetary number values, an integer that falls within a range of integers, whether or not the user has checked a box or made a particular selection, or other kinds of variables. The variable data 142 related to a particular calculation includes multiple of these different types of variables.

In one embodiment, the electronic document preparation system 112 is a tax return preparation system. In this case, in one embodiment, the new calculation data 140 includes a new process for calculating data values for many data fields or lines of a tax form. In various embodiments, a single data field or line depends on variables such as, but not limited to, a user's gross income, a user's age, a number of dependents, taxes withheld, whether or not the user is a veteran, whether or not the user is a homeowner, whether or not a user has elected a particular tax preparation feature, data values from a separate tax worksheet, data values from a separate tax form, or many other kinds of tax related variables. Thus, in one embodiment, the calculation associated with the new calculation data 140 includes a large number of variables whose values may be provided by the user, obtained from the user, calculated in a different tax form, or as otherwise provided by any other source of variable data, as discussed herein, or as known in the art at the time of filing, or as developed after the time of filing. The variable data 142 associated with a particular tax related calculation identifies the tax related variables related to that calculation.

In one embodiment, the prior code database 116 includes prior code data 144 utilized by the electronic document preparation system 112 in the past to perform various calculations to prepare electronic documents for users. The prior code data 144 corresponds to previously used software instructions. Thus, the prior code database 116 retains previous versions of software instructions utilized by the electronic document preparation system 112. In one embodiment, the prior code database 116 includes software instructions currently used by the electronic document preparation system 112 to prepare electronic documents.

In one embodiment, the electronic document preparation system 112 retains the prior code data 144, at least in part, in order to be able to test new calculations and processes for preparing electronic documents. As set forth previously, the new calculation data 140 may include a new process or calculation for populating a form associated with an electronic document. The form itself and its requirements may be identical or similar to the requirements for that same form at a time when the prior code data was utilized by the electronic document preparation system 112 to prepare electronic documents. In this case, the prior code data 144 is used as a basis for comparison to determine if the new calculation data 140 is accurate. If the prior code data was known to be accurate, and the new calculation data 140 provides the same data values for the same historical users as the prior code data, then the new calculation data 140 can be determined to be accurate. Thus, in one embodiment, the prior code database 116 retains the prior code data 144 for testing purposes.

In one embodiment, the electronic document preparation system 112 retains the prior code data 144 in order to assist in generating a training set for testing the new calculation data 140. As will be set forth in more detail below, in one embodiment, the electronic document preparation system 112 executes the prior code data 144 for a large number of historical users in order to determine what portions of the code were utilized for each of the historical users. In one embodiment, this knowledge is applied to select a training set of historical users for testing the new calculation data 140.

In one embodiment, the prior code database 116 retains the prior code data 144 because the electronic document preparation system still uses the prior code data 144. In this case, the prior code data 144 is also the current code used by the electronic document preparation system to prepare electronic documents for users of the electronic document preparation system 112 until new calculations can be devised, tested, and implemented.

In one embodiment, the electronic document preparation system 112 uses the historical user database 118 to store, gather, or retrieve historical user data 146. The historical user data 146 includes previously prepared documents for a large number of previous users of the electronic document preparation system 112. The historical user data 146 includes all of the forms that were populated and utilized to prepare electronic documents for each of the historical users. The historical user data 146 includes data values and attributes related to each of the historical users. In various embodiments, the data values and attributes include data provided by the user, data obtained from the user, data related to the user and obtained from third-party sources, and data generated by the electronic document preparation system 112. The historical user data 146 includes all of the related data used to prepare electronic documents for the historical users. Thus, the historical user data 146 includes data values for all of the variables associated with all of the data values for the lines of the various forms associated with the previously prepared documents.

In one embodiment, the historical user data 146 includes previously prepared electronic documents which were filed with or approved by a government or other institution. In this way, the historical user data 146 can be assured in large part to be accurate and properly prepared, though some of the previously prepared documents will inevitably include errors. The historical user data 146 is utilized in testing the accuracy of the new calculation data 140 as will be set forth in more detail below.

In one embodiment, the electronic document preparation system 112 is a financial document preparation system. In this case, the historical user data 146 includes historical financial data. The historical financial data includes, for each historical user of the electronic document preparation system 112, information, such as, but not limited to, a job title, annual income, salary and wages, bonuses, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial document preparation system or in the preparation of financial documents such as a user's tax return and/or any as discussed herein, or as known in the art at the time of filing, or as developed after the time of filing, according to various embodiments.

In one embodiment, the electronic document preparation system 112 utilizes the prior code execution engine 120 to assist in generating training set data for testing new calculations. The prior code execution engine 120 executes the prior code data 144 for the historical user data 146. The electronic document preparation system 112 analyzes the steps taken by the prior code execution engine 120 in executing the historical user data for each user in order to identify groups of similar historical users based on how the prior code execution engine 120 executed the prior code data 144 for the historical users. The electronic document preparation system 112 then samples one or more historical users from each group in order to generate the training set data 160.

In one embodiment, the prior code execution engine 120 is an instrumented prior code execution engine. As set forth above, the prior code data 144 corresponds to a previous version of software code utilized by the electronic document preparation system 112, a previous version of the electronic document preparation system 112, or a separate electronic document preparation system in order to generate electronic documents for users. The electronic document preparation system 112, or another electronic document preparation system from which the prior code data 144 has been obtained, utilized a code execution engine to execute the prior code data 144 in order to generate the electronic documents. The prior code execution engine 120 is an instrumented version of the code execution engine originally utilized to execute the prior code data 144. The prior code execution engine 120 has been instrumented to not only execute the prior code data 144 for each historical user, but to output data indicating which portions of the prior code data 144 were executed for each historical user.

In one embodiment, the prior code execution engine 120 generates trace log data 148 for each historical user. When the prior code execution engine 120 executes the prior code data 144 with historical user data 146 related to a historical user, the prior code execution engine 120 generates trace log data 148 for that historical user. The trace log data 148 indicates which sections of the prior code data 144 were executed by the prior code execution engine 120 for the historical user.

In one embodiment, the prior code data 144 is very complex and may include many millions of lines of software instructions. In one embodiment, for a given calculation, and a given historical user, the prior code execution engine 120 executes only particular sections or lines of the prior code data 144 based on the data values of the variables for the historical user. The attributes of each historical user, in accordance with the prior code data 144, will cause the prior code execution engine 120 to execute certain portions of the prior code data 144 and to not execute certain other portions of the prior code data 144.

In one embodiment, the electronic document preparation system 112 generates groups of similar historical users based on how the prior code execution engine 120 executes the prior code data 144 from those users. In one embodiment, historical users with similar attributes results in the same or similar sections of the prior code data 144 being executed. The prior code execution engine 120 identifies groups such that the combination of groups results in all of the sections of the prior code data 144 being executed. Some groups represent common code paths, while other groups represent rare or uncommon code paths. The groups taken together represent all the code paths. The prior code execution engine 120 generates the groups.

In one embodiment, the prior code execution engine 120 generates, for each historical user, trace log data 148. The trace log data 148 indicates the sections, lines, or portions, of the prior code data 144 that were executed by the prior code execution engine 120. The trace log data 148 indicates the path taken through the prior code data 144 by the prior code execution engine 120 in executing the prior code data 144.

In one embodiment, the trace log data 148 indicates the results of execution of the various lines or sections of code. In one example, a particular portion of the prior code data 144 includes an if-then statement which will be executed based on a characteristic of the historical user has included in the historical user data 146. The trace log data 148 indicates the result of the if-then statement. Furthermore, the next section of code executed by the prior code execution engine 120 depends on the result of the if-then statement. Thus, the trace log data 148 indicates the result of the if-then statement, as well as the next section of code that was executed by the prior code execution engine 120. The prior code data 144 may also contain for loops, do loops, while loops, various logical operators, and many other kinds of software instructions, the execution of which, will depend on the particular attributes of the historical user as indicated by the historical user data 146. The trace log data 148 indicates the results of each operation, as well as the next section of the prior code data 144 executed.

In one embodiment, the trace log data 148 includes section data 150. The section data 150 indicates sections of the prior code data 144 executed by the prior code execution engine 120. As the prior code execution engine 120 executes the prior code data 144, the instrumentation of the prior code execution engine 120 causes the prior code execution engine 120 to generate trace log data 148 including section data 150 indicating each section of the prior code data 144 for that was executed by the prior code execution engine 120.

In one embodiment, the trace log data 148 includes line data 152. In one embodiment, each section of the prior code data 144 includes many lines of code. The line data 152 indicates which lines of a particular section of the prior code data 144 were executed by the prior code execution engine 120.

In one embodiment, the trace log data 148 also indicates data values that were provided or entered for certain lines or sections of code. In one embodiment, the trace log data 148 indicates whether a particular data value provided for a line or section of code is a positive number, zero, blank, or a negative number. In one embodiment, the prior software code includes lines that define a variable as being the smaller, or minimum, of two or more other variables. The trace log data 148 indicates which of the other variables was the minimum for each historical user. In one embodiment, the prior software code includes lines that define a variable as being the larger, or maximum, of two or more other variables. The trace log data 148 indicates which of the other variables was the larger or maximum for each historical user. In one embodiment, when evaluating a less than or equal to operator in the prior code data 144, the trace log data 148 indicates whether a result is true for being less than or true for being equal. In one embodiment, when evaluating a greater than or equal to operator in the prior code data 144, the trace log data 148 indicates whether a result is true for being greater than or true for being equal. In one embodiment, when evaluating the result of an absolute value operator in the prior code data 144, the trace log data 148 indicates whether a value was negative and changed to positive as a result of the absolute value operator, or whether the value was already positive. In one embodiment, when evaluating a Boolean expression in the prior code data 144, the trace log data 148 indicates whether the result of the Boolean expression is true or false for each historical user. In one embodiment, the trace log data 148 data indicates these factors and these factors are used to identify unique groups of historical users for the purpose of generating training set data.

In one embodiment, the electronic document preparation system 112 utilizes the trace log processing module 122 to process the trace log data 148 in order to generate code coverage data 154. The trace log processing module 122 receives the trace log data 148 related to each historical user for which the prior code data 144 was executed by the prior code execution engine 120. The trace log data 148 includes a separate trace log for each historical user. The trace log processing module 122 processes the trace log data 148 for each of the historical users and generates code coverage data 154 indicating the portions of the prior code data 144 that were executed for all of the historical users. In one embodiment, the code coverage data 154 also indicates which data values, or which kinds of data values, were returned or provided for various sections or lines of the prior code data 144 for each of the historical users.

In one embodiment, the code coverage data 154 includes table data 156. The table data 156 includes a table indicating sections of the prior code data and historical users. The table data 156 indicates which sections of the prior code data 144 were executed for each historical user. Alternatively, or additionally, the code coverage data 154 can include data structures other than tables indicating which portions of the prior code data 144 were executed for the various historical users.

In one embodiment, the electronic document preparation system 112 utilizes the sampling module 124 in order to generate grouping data 158. The grouping data 158 indicates groups of historical users based on the code coverage data 154. The sampling module 124 generates the groups based on which sections of the prior code data 144 were executed for the historical users as indicated by the code coverage data 154.

In one embodiment, the electronic document preparation system 112 utilizes the sampling module to generate grouping data 158 based not only which sections of the prior code data 144 were executed for the historical users, but also based on which data values or types of data values were returned or provided for various lines or sections of the prior code data 144.

In one embodiment, each group corresponds to a unique combination of sections of the prior code data 144 executed for one or more historical users. For example, if the code coverage data 154 indicates that there were 1000 unique combinations of sections of the prior code data 144 executed for the historical users, then the grouping data 158 will include 1000 groups. Each historical user represented in the code coverage data 154 is placed in one of the groups in accordance with the combination of sections of the prior code data 144 executed for that historical user in accordance with the historical user data 146 related to that historical user.

In one embodiment, the sampling module 124 generates training set data 160 by sampling a relatively small number of historical users from each group represented by the grouping data 158. Even though a small number of historical users are sampled, the portion of the historical user data 146 represented by the training set data 160 is highly effective for testing the new calculation data 140 because the training set data 160 includes historical users from each group represented by the grouping data 158. The manner in which the grouping data 158 is generated ensures that groups are generated for historical users with rare or extreme combinations of attributes, as well as for users with more common combinations of attributes. Because each group includes historical users for whom the prior code execution engine 120 executed the same portions of the prior code data 144, and because the groups taken together represent execution of all of the prior code data 144, sampling a very small number of historical users from each group results in training set data 160 that is representative of each type of historical user, including historical users with very rare or uncommon attributes.

In one embodiment, the sampling module 124 samples a single user from each group. Because each unique combination of sections of prior code is represented by its own group, sampling even a single user from each group ensures a training set that that can effectively test the new calculation data 140.

In one embodiment, the sampling module 124 generates the training set data 160. The training set data 160 includes the historical user data 146 related to the historical users sampled from the grouping data 158.

In one embodiment, the testing module 126 is configured to test the new calculation data 140 to determine the accuracy of the new calculation data 140. The testing module 126 receives the new calculation data 140 from the new code database 114. The testing module 126 receives the training set data 160 from the sampling module 124. The training set data includes those portions of the historical user data 146 associated with the historical users identified in the training set data 160. The training set data 160 also includes the previously prepared electronic documents identified in the training set data 160 and all of the data associated with the previously prepared documents. The testing module 126 then executes the new calculation data 140 with the data values from training set data 160 associated with the variable data 142. Executing the new calculation data 140 results in the generation of test data 162. The test data corresponds to those data values that that are generated by the new calculation data 140 based on the data values of the variables from the training set data 160 associated with the variable data 142. The testing module 126 then generates results data 164 by comparing the test data 162 to the corresponding data values from the training set data. If the test data matches the corresponding data values from the results data 164, then this indicates that the new calculation is accurate.

In one embodiment, the prior code execution engine 120 generates trace log data 148 for each historical user for the entirety of the historical user data 146 related to the historical user. Likewise, the trace log processing module 122 generates code coverage data 154 for the entirety of the trace log data 148 for every historical user. Thus, the code coverage data 154 includes a vast amount of data for all of the historical users and the entirety of the prior code data 144. However, in most circumstances, a new calculation to be tested is related only to a particular part of the prior code data. When the new calculation data 140 is to be tested, the testing need only take place based on the relevant part of the prior code data 144 and the corresponding part of the code coverage data 154.

Accordingly, in one embodiment, the trace log processing module 122 generates the code coverage data 154 in such a way that particular segments or parts of the code coverage data 154 can be separately accessed. The code coverage data 154 includes separate portions for the various parts of the prior code data 144. Thus, when a new calculation is to be tested, the sampling module 124 generates grouping data 158 based only on a relevant part of the code coverage data 154. The sampling module 124 then generates the training set data 160 by sampling the grouping data 158. Because the grouping and sampling is performed only for a relevant part of the code coverage data 154, the sampling module 124 can generate the training set data 160 for testing the new calculation in an efficient manner from the segmented code coverage data 154.

In one embodiment, due to the large size of the entirety of the code coverage data 154, the trace log processing module 122 can store the code coverage data 154 with a third-party data service provider 170. In one embodiment, when the electronic document preparation system 112 needs training set data to test the new calculation, the electronic document preparation system 112 requests and receives a relevant portion of the code coverage data 154 from the third-party data service provider 170. The sampling module 124 then generates the grouping data 158 and the training set data 160 from the portion of the code coverage data 154 obtained from the third-party data service provider 170. Alternatively, the electronic document preparation system 112 stores and maintains the entirety of the code coverage data 154 in an internal database.

In one embodiment, the electronic document preparation system 112 utilizes the interface module 128 to enable systems or personnel associated with the electronic document preparation system 112 to request generation of training set data 160 to test the new calculation data 140. When the new calculation is to be tested, a system or individual associated with electronic document preparation system 112 can enter query data 166 via the interface module 128. The query data 166 indicates a portion of the code coverage data 154 to be retrieved for generation of training set data 160. The query data 166 can indicate a particular form or variable related to the new calculation data 140. The electronic document preparation system 112 then identifies which portion of the code coverage data 154 is relevant to the query data 166. The sampling module 124 receives the relevant portion of the code coverage data 154 and generates the grouping data 158 and the training set data 160. The testing module 126 then tests the new calculation data 140 with the training set data 160 and generates results data 164. The interface module returns the results data 164 to the system or personnel that originally made the request. In one embodiment, the interface module 128 returns the training set data 160 based on the query data 166.

In one embodiment, the electronic document preparation system 112 is a tax return preparation system. The historical user data 146 includes, for a plurality of historical users of the tax return preparation system, all of the data utilized by the tax return preparation system to generate the tax returns for the users. To prepare a tax return for a user, the tax return preparation system utilizes a large amount of data related to the user, as well as a large number of tax related forms. The tax forms can include government issued tax forms, government issued worksheets for filling out other tax forms, internal tax forms, internal worksheets for filling out tax forms, and other kinds of tax forms. When the tax return preparation system prepares a tax return for a user, the tax return preparation system utilizes various tax forms. The historical user data 146 includes, for each historical user, all of the tax forms utilized to prepare the tax return for the historical user, as well as all of the data related to the tax return and utilized by the tax return preparation system to prepare the various tax forms. When the tax return preparation system prepares a tax return for a user, the tax return preparation system executes various sections of the prior code data 144 based on the tax forms utilized by the user and the particular attributes of the user as reflected in the historical user data.

In one embodiment, the tax return preparation system utilizes the prior code execution engine 120 to execute the prior code data 144 for each historical user. For each historical user, the prior code execution engine 120 receives the historical user data 146 related to the historical user. The prior code execution engine 120 then executes the prior code data 144 for each historical user data 146 related to the historical user. Executing the historical user data 146 for a historical user results in the reproduction of the previously prepared tax return of the historical user. The prior code execution engine 120 also generates trace log data 148 for each historical user. The trace log data 148 for a historical user indicates which portions of the prior code data 144 were executed for the historical user. The trace log data 148 for the historical user is, in one embodiment, several megabytes in size.

In one embodiment, the historical user data 146 includes, for each user, tax related attributes of the historical users. If a form included in the historical user data 146 for a user indicates that the user has 0 dependents, then the prior code data 144 will cause the prior code execution engine 120 to execute different portions of the prior code data 144 than would be executed for a user that has four dependents. Likewise, various income values, home ownership, marital status, employment status, and many other kinds of tax related attributes can cause the prior code execution engine 120 to execute different parts of the prior code data 144.

In one embodiment, the trace log processing module 122 generates code coverage data 154 by processing the trace log data 148 for each historical user. The code coverage data 154 indicates which portions of the prior code data 144 were executed for each historical user.

In one embodiment, the new calculation data 140 can correspond to a new tax calculation to be tested. The new tax calculation can correspond to a new calculation for populating a new tax form, for populating a portion of the new tax form, or for populating a particular line of a new tax form. Only certain parts of the code coverage data 154 are relevant to the new calculation. Accordingly, a system or individual associated with the electronic document preparation system 112 inputs query data 166 to the interface module 128 indicating the part of the code coverage data 154 from which training set data 160 should be generated. The tax return preparation system requests and receives the relevant portion of the code coverage data 154 from the third-party data service provider 170, or from an internal database. The sampling module 124 receives only that portion of the code coverage data 154 that corresponds to the query data 166. The sampling module 124 generates the grouping data 158 and the training set data 160 from the part of the code coverage data 154 that is relevant to the query data 166, rather than from the entirety of the code coverage data 154. In this way, the tax return preparation system efficiently utilizes system resources in generating training set data 160 for testing the new calculation data 140.

In one embodiment, the prior code execution engine 120 includes an instrumented run-time engine. In one embodiment, the prior code execution engine includes an instrumented compiler.

FIG. 2 is a representation of a code coverage table 200, according to one embodiment. Referring now to FIG. 1, the discussion related to FIG. 1, and FIG.2, the code coverage table 200 represents a part of the code coverage data 154. In particular, the code coverage table 200 is an example of table data 156 from the code coverage data 154. The code coverage table 200 corresponds to a part of the code coverage data 154 that is relevant to a new calculation to be tested, and for which training set data 160 has been requested.

The code coverage table 200 is in the form of a matrix, according to one embodiment. The rows of the matrix correspond to sections of the prior code data 144 that are relevant to the new calculation to be tested. The sections of the prior code data 144 can correspond to sections of the prior code data 144 that are related to a particular tax form for which a new calculation is being tested. In the example of the code coverage table 200, there are M sections of code. The columns of the code coverage table 200 correspond to historical users of the electronic document preparation system 112. In the example of the code coverage table 200, there are N historical users in the code coverage data 154. In various embodiments, the value of N may be as large as several million.

In one embodiment, the values in each data field indicate whether or not the corresponding code section was executed for the corresponding historical user. In the example of the code coverage table 200, a value of 0 indicates that the code section was not executed for that historical user. A value of 1 indicates that the code section was executed for that historical user. In one embodiment, the data values other than 0 and 1 can be utilized in the data fields of the code coverage table 200. For example, data values can be utilized to indicate how many times a code section was executed for a particular user. This is quite useful because some sections of code may be executed many times for a single user.

In one embodiment, the values in each column make up a vector that characterizes the historical user associated with the column. Thus, each historical user is represented by a vector that indicates the sections of the prior code data 144 that were executed for the user. In one embodiment, the sampling module 124 generates the grouping data 158 by identifying identical columns from the table data 200 and grouping the historical users accordingly. Each unique vector represented in the table data 200 corresponds to a group in the grouping data 158. Each historical user is sorted into the group corresponding to the vector representing the historical user. In the example of the code coverage table 200, historical user 2 and historical user 5 have identical column vectors, and will belong the same group.

In one embodiment, because the value M may be very large, a hash function is applied to each vector, resulting in the generation of a hash for each column or historical user. Historical users that have identical hashes fall within the same group. Thus, each group corresponds to a unique hash value.

In one embodiment, the sampling module generates the training set data 160 by sampling one or more historical users from each group from the grouping data 158. The sampling module 124 then passes the training set data 160 back to the interface module 128 or directly to the testing module 126 so that the new calculation can be tested.

FIG. 3 is a representation of a code coverage table 300, according to one embodiment. With reference to FIG. 1, the discussion related to FIG. 1, to FIG. 2, the discussion related to FIG. 2, and FIG.3, the code coverage table 300 represents a part of the code coverage data 154. In particular, the code coverage table 300 is an example of table data 156 from the code coverage data 154. The code coverage table 300 corresponds to a part of the code coverage data 154 that is relevant to a new calculation to be tested, and for which training set data 160 has been requested.

The code coverage table 300 is in the form of a matrix, according to one embodiment. The rows of the matrix correspond to lines of the prior code data 144 that are relevant to the new calculation to be tested. The lines of the prior code data 144 correspond to line of the prior code data 144 that are related to a particular tax form for which a new calculation is being tested. In the example of the code coverage table 300, there are M lines of code. The columns of the code coverage table 200 corresponds to historical users of the electronic document preparation system 112. In the example of the code coverage table 300, there are N historical users in the code coverage data 154.

Embodiments of the present disclosure overcome the drawbacks of traditional electronic document preparation systems that generate training set data by taking a random sample of the entire group of historical users, resulting in the high likelihood that historical users with very rare combinations of attributes will not be present in the training set data. Embodiments of the present disclosure also overcome the drawbacks of traditional electronic document preparation systems that generate training set data including a very large number of historical users in order to increase the likelihood that historical users with rare attributes will be represented. Embodiments of the present disclosure overcome these drawbacks by providing a very small sample of historical users that will include all types of historical users based on analysis of previous versions of software code executed from the historical users.

Process

Figure 4:
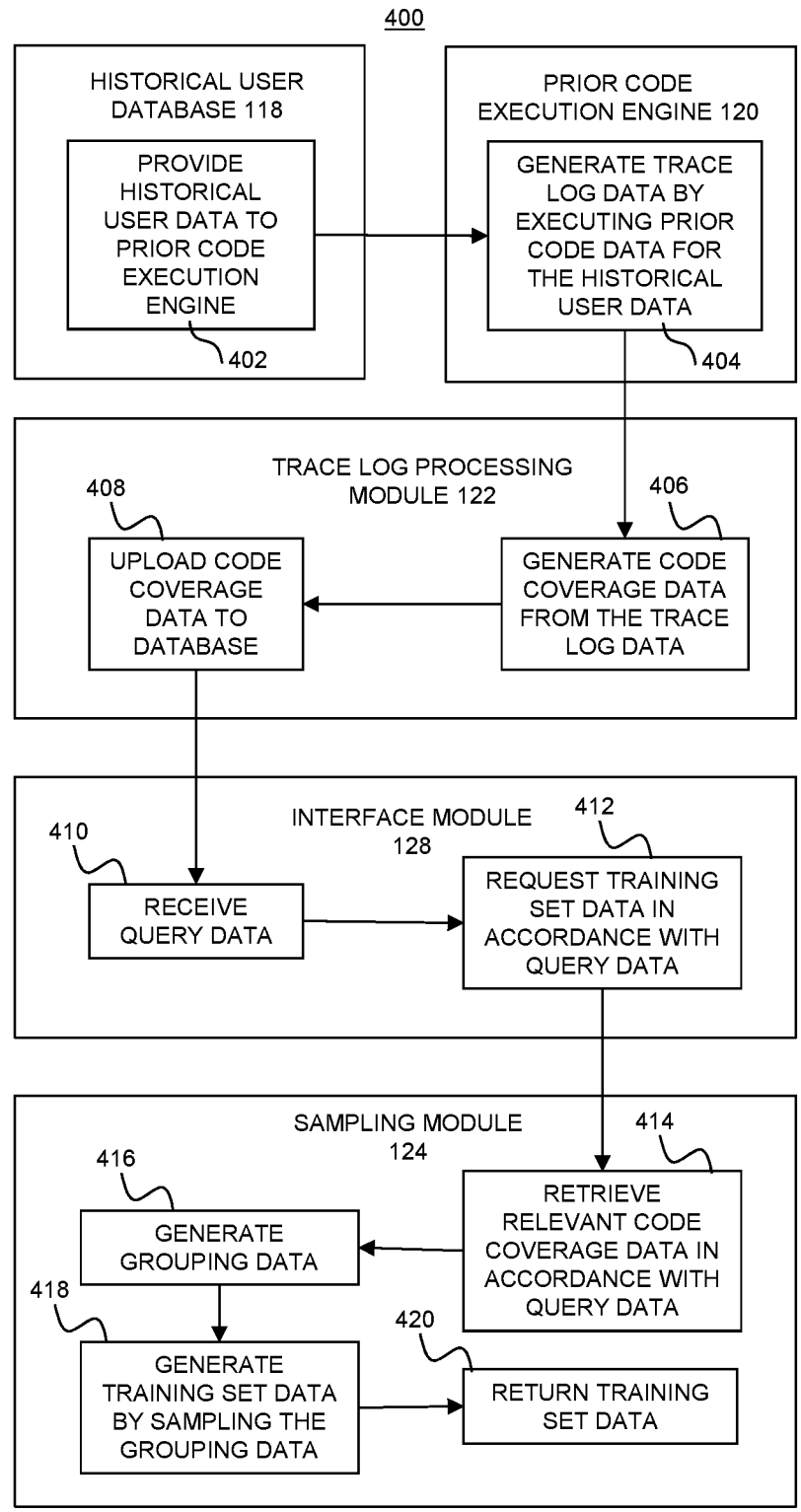
FIG. 4 is a functional flow diagram of a process for generating efficient training sets for testing new processes for preparing electronic documents for users of an electronic document preparation system, in accordance with one embodiment.

FIG. 4 illustrates a functional flow diagram of a process 400 for generating efficient training sets for testing new processes for preparing electronic documents for users of an electronic document preparation system, in accordance with various embodiments.

Referring to FIG. 2, FIGS. 1-3, and the descriptions of FIGS. 1-3 above, and FIG. 4, at block 402, the historical user database 118 provides historical user data to the prior code execution engine 120, using any of the methods, processes, and procedures discussed above with respect to FIGS. 1-3, according to one embodiment. From block 402 the process proceeds to block 404.

At block 404, the prior code execution engine 120 generates trace log data by executing prior code data for the historical user data, using any of the methods, processes, and procedures discussed above with respect to FIGS. 1-3, according to one embodiment. From block 404 the process proceeds to block 406.

At block 406, the trace log processing module 122 generates code coverage data from the trace log data, using any of the methods, processes, and procedures discussed above with respect to FIGS. 1-3, according to one embodiment. From block 406 the process proceeds to block 408.

At block 408, the trace log processing module 122 uploads code coverage data to a database, using any of the methods, processes, and procedures discussed above with respect to FIGS. 1-3, according to one embodiment. From block 408 the process proceeds to block 410.

At block 410 the interface module 128 receives query data requesting training set data for testing the new calculation, using any of the methods, processes, and procedures discussed above with respect to FIGS. 1-3, according to one embodiment. From block 410 the process proceeds to block 412.

At block 412 the interface module 128 requests training set data in accordance with the query data, using any of the methods, processes, and procedures discussed above with respect to FIGS. 1-3, according to one embodiment. From block 412 the process proceeds to block 414.

At block 414 the sampling module 124 retrieves relevant code coverage data in accordance with the query data, using any of the methods, processes, and procedures discussed above with respect to FIGS. 1-3, according to one embodiment. From block 414 the process proceeds to block 416.

At block 416 the sampling module generates grouping data 416, using any of the methods, processes, and procedures discussed above with respect to FIGS. 1-3, according to one embodiment. From block 416 the process proceeds to block 418.

At block 418, the sampling module 124 generates training set data by sampling the grouping data, using any of the methods, processes, and procedures discussed above with respect to FIGS. 1-3, according to one embodiment. From block 418 the process proceeds to block 420.

At block 420 the sampling module 124 returns the training set data, using any of the methods, processes, and procedures discussed above with respect to FIGS. 1-3, according to one embodiment. The sampling module 124 returns the training set data to the interface module 128 or to the testing module 126.

Those of skill in the art will recognize, in light of the present disclosure, that the process 400 can include different steps, different orders of steps, and steps performed by modules other than those represented in FIG. 4. All such other processes fall within the scope of the present disclosure.

Figure 5:
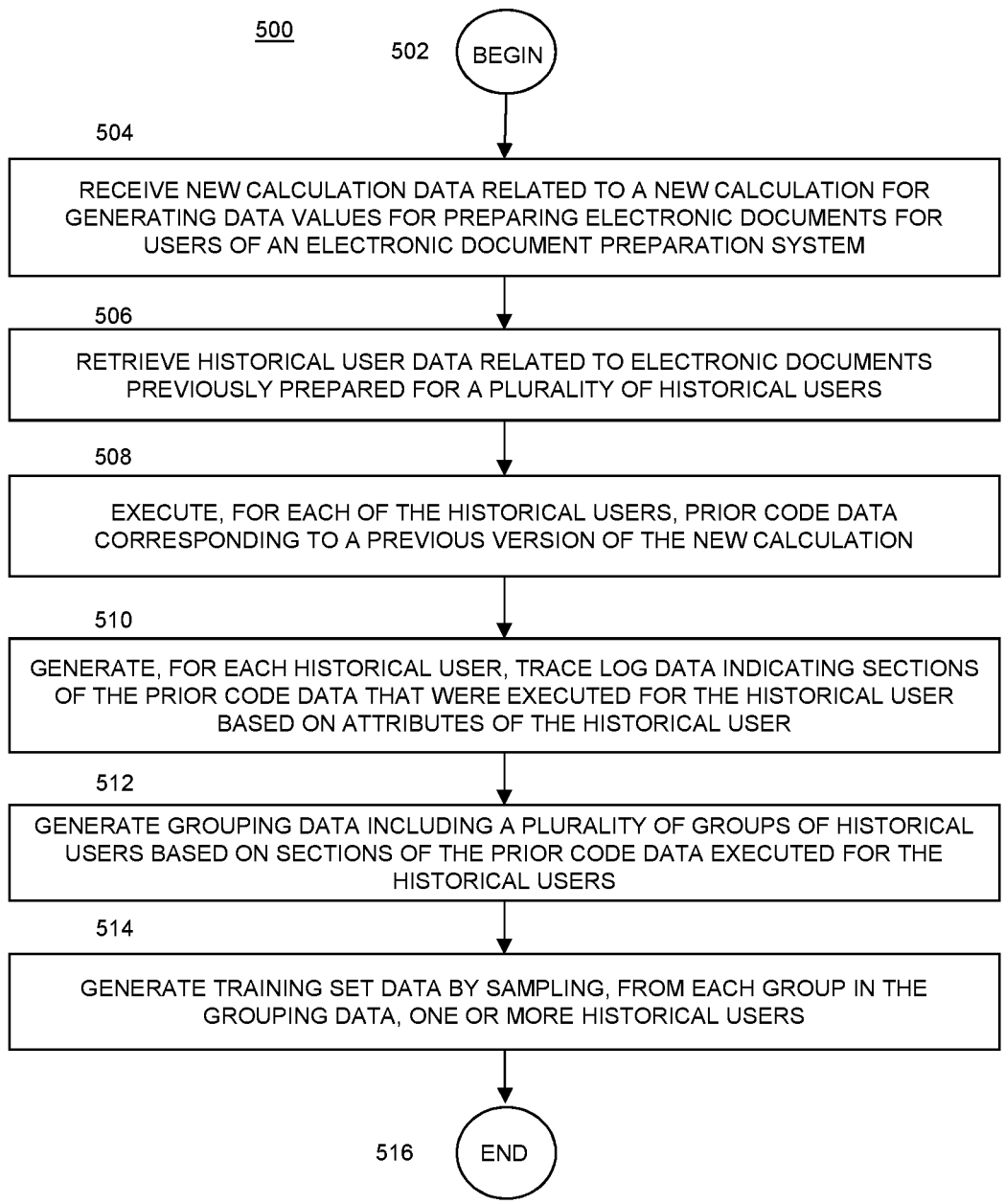
FIG. 5 is a flow diagram of a process for generating efficient training sets for testing new processes for preparing electronic documents for users of an electronic document preparation system, in accordance with one embodiment.

FIG. 5 illustrates a flow diagram of a process 500 for generating efficient training sets for testing new processes for preparing electronic documents for users of an electronic document preparation system, in various embodiments.

Referring to FIG. 5, FIGS. 1-3, and the description of FIGS. 1-3 above, in one embodiment, process 500 begins at BEGIN 502 and process flow proceeds to RECEIVE NEW CALCULATION DATA RELATED TO A NEW CALCULATION FOR GENERATING DATA VALUES FOR PREPARING ELECTRONIC DOCUMENTS FOR USERS OF AN ELECTRONIC DOCUMENT PREPARATION SYSTEM 504.

In one embodiment, at RECEIVE NEW CALCULATION DATA RELATED TO A NEW CALCULATION FOR GENERATING DATA VALUES FOR PREPARING ELECTRONIC DOCUMENTS FOR USERS OF AN ELECTRONIC DOCUMENT PREPARATION SYSTEM 504, new calculation data is received related to a new calculation for generating data values for preparing electronic documents for users of an electronic document preparation system, using any of the methods, processes, and procedures discussed above with respect to FIGS. 1-3.

In one embodiment, once new calculation data is received related to a new calculation for generating data values for preparing electronic documents for users of an electronic document preparation system at RECEIVE NEW CALCULATION DATA RELATED TO A NEW CALCULATION FOR GENERATING DATA VALUES FOR PREPARING ELECTRONIC DOCUMENTS FOR USERS OF AN ELECTRONIC DOCUMENT PREPARATION SYSTEM 504 process flow proceeds to RETRIEVE HISTORICAL USER DATA RELATED TO ELECTRONIC DOCUMENTS PREVIOUSLY PREPARED FOR A PLURALITY OF HISTORICAL USERS 506.

In one embodiment, at RETRIEVE HISTORICAL USER DATA RELATED TO ELECTRONIC DOCUMENTS PREVIOUSLY PREPARED FOR A PLURALITY OF HISTORICAL USERS 506, historical user data is received related to electronic documents previously prepared for a plurality of historical users, using any of the methods, processes, and procedures discussed above with respect to FIGS. 1-3.

In one embodiment, once historical user data is received related to electronic documents previously prepared for a plurality of historical users at RETRIEVE HISTORICAL USER DATA RELATED TO ELECTRONIC DOCUMENTS PREVIOUSLY PREPARED FOR A PLURALITY OF HISTORICAL USERS 506, process flow proceeds to EXECUTE, FOR EACH OF THE HISTORICAL USERS, PRIOR CODE DATA CORRESPONDING TO A PREVIOUS VERSION OF THE NEW CALCULATION 508.

In one embodiment, at EXECUTE, FOR EACH OF THE HISTORICAL USERS, PRIOR CODE DATA CORRESPONDING TO A PREVIOUS VERSION OF THE NEW CALCULATION 508, prior code data is executed for each of the historical users corresponding to a previous version of the new calculation, using any of the methods, processes, and procedures discussed above with respect to FIGS. 1-3.

In one embodiment, once prior code data is executed for each of the historical users corresponding to a previous version of the new calculation at EXECUTE, FOR EACH OF THE HISTORICAL USERS, PRIOR CODE DATA CORRESPONDING TO A PREVIOUS VERSION OF THE NEW CALCULATION 508, process flow proceeds to GENERATE, FOR EACH HISTORICAL USER, TRACE LOG DATA INDICATING SECTIONS OF THE PRIOR CODE DATA THAT WERE EXECUTED FOR THE HISTORICAL USER BASED ON ATTRIBUTES OF THE HISTORICAL USER 510.

In one embodiment, at GENERATE, FOR EACH HISTORICAL USER, TRACE LOG DATA INDICATING SECTIONS OF THE PRIOR CODE DATA THAT WERE EXECUTED FOR THE HISTORICAL USER BASED ON ATTRIBUTES OF THE HISTORICAL USER 510, trace log data is generated for each historical user indicating sections of the prior code data that were executed for the historical user based on attributes of the historical user, using any of the methods, processes, and procedures discussed above with respect to FIGS. 1-3.

In one embodiment, once trace log data is generated for each historical user indicating sections of the prior code data that were executed for the historical user based on attributes of the historical user at GENERATE, FOR EACH HISTORICAL USER, TRACE LOG DATA INDICATING SECTIONS OF THE PRIOR CODE DATA THAT WERE EXECUTED FOR THE HISTORICAL USER BASED ON ATTRIBUTES OF THE HISTORICAL USER 510, process flow proceeds to GENERATE GROUPING DATA INCLUDING A PLURALITY OF GROUPS OF HISTORICAL USERS BASED ON SECTIONS OF THE PRIOR CODE DATA EXECUTED FOR THE HISTORICAL USERS 512.

In one embodiment, at GENERATE GROUPING DATA INCLUDING A PLURALITY OF GROUPS OF HISTORICAL USERS BASED ON SECTIONS OF THE PRIOR CODE DATA EXECUTED FOR THE HISTORICAL USERS 512, grouping data is generated including a plurality of groups of historical users based on sections of the prior code data executed for the historical users, using any of the methods, processes, and procedures discussed above with respect to FIGS. 1-3.

In one embodiment, once grouping data is generated including a plurality of groups of historical users based on sections of the prior code data executed for the historical user at GENERATE GROUPING DATA INCLUDING A PLURALITY OF GROUPS OF HISTORICAL USERS BASED ON SECTIONS OF THE PRIOR CODE DATA EXECUTED FOR THE HISTORICAL USERS 512, process flow proceeds to GENERATE TRAINING SET DATA BY SAMPLING, FROM EACH GROUP IN THE GROUPING DATA, ONE OR MORE HISTORICAL USERS 514.

In one embodiment, at GENERATE TRAINING SET DATA BY SAMPLING, FROM EACH GROUP IN THE GROUPING DATA, ONE OR MORE HISTORICAL USERS 514, sampling data is generated by sampling, from each group in the grouping data, one or more historical users, using any of the methods, processes, and procedures discussed above with respect to FIGS. 1-3.

In one embodiment, once sampling data is generated by sampling, from each group in the grouping data, one or more historical users at GENERATE TRAINING SET DATA BY SAMPLING, FROM EACH GROUP IN THE GROUPING DATA, ONE OR MORE HISTORICAL USERS 514, process flow proceeds to END 516.

In one embodiment, at END 516 the process 500 for generating efficient training sets for testing new processes for preparing electronic documents for users of an electronic document preparation system is exited to await new data and/or instructions.

Figure 6:
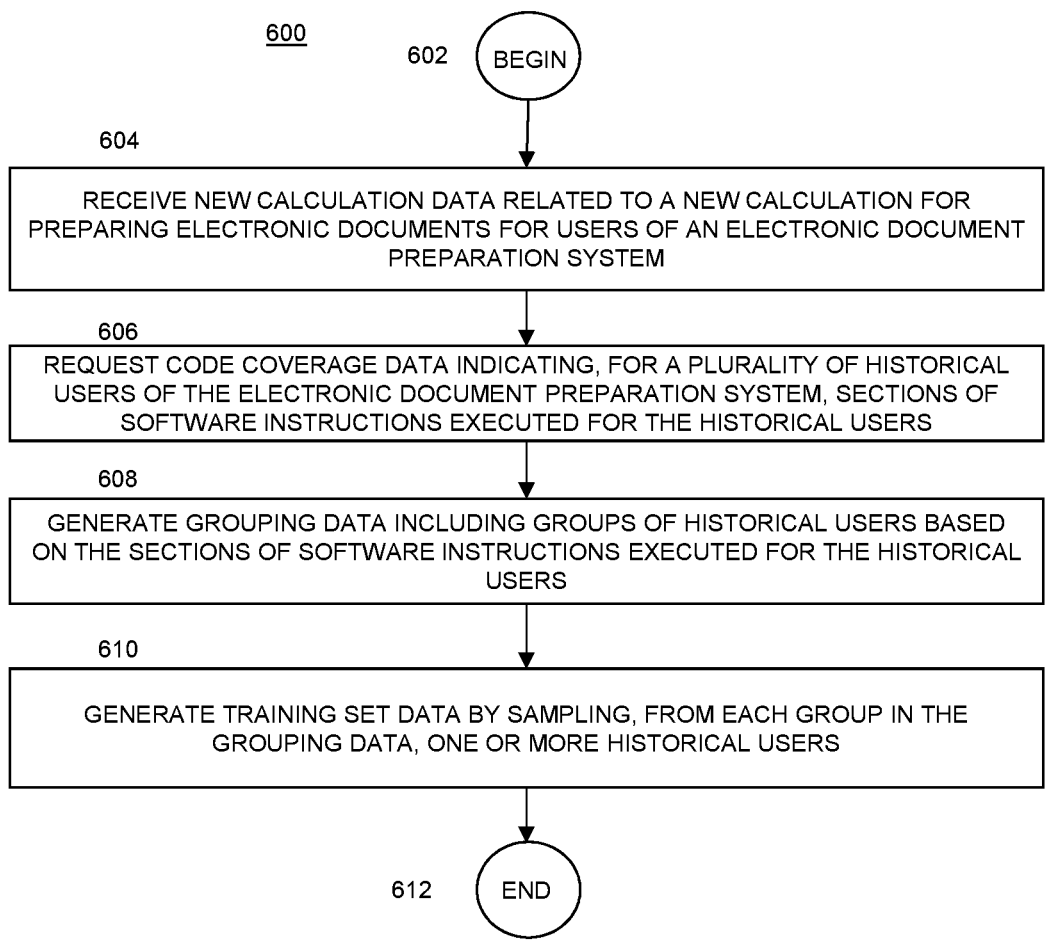
FIG. 6 is a flow diagram of a process for generating efficient training sets for testing new processes for preparing electronic documents for users of an electronic document preparation system, in accordance with one embodiment.

FIG. 6 illustrates a flow diagram of a process 600 for generating efficient training sets for testing new processes for preparing electronic documents for users of an electronic document preparation system, in various embodiments.

Referring to FIG. 6, FIGS. 1-3, and the description of FIGS. 1-3 above, in one embodiment, process 600 begins at BEGIN 602 and process flow proceeds to RECEIVE NEW CALCULATION DATA RELATED TO A NEW CALCULATION FOR PREPARING ELECTRONIC DOCUMENTS FOR USERS OF AN ELECTRONIC DOCUMENT PREPARATION SYSTEM 604.

In one embodiment, at RECEIVE NEW CALCULATION DATA RELATED TO A NEW CALCULATION FOR PREPARING ELECTRONIC DOCUMENTS FOR USERS OF AN ELECTRONIC DOCUMENT PREPARATION SYSTEM 604, new calculation data is received related to a new calculation for generating data values for preparing electronic documents for users of an electronic document preparation system, using any of the methods, processes, and procedures discussed above with respect to FIGS. 1-3.

In one embodiment, once new calculation data is received related to a new calculation for generating data values for preparing electronic documents for users of an electronic document preparation system at RECEIVE NEW CALCULATION DATA RELATED TO A NEW CALCULATION FOR PREPARING ELECTRONIC DOCUMENTS FOR USERS OF AN ELECTRONIC DOCUMENT PREPARATION SYSTEM 604 process flow proceeds to REQUEST CODE COVERAGE DATA INDICATING, FOR A PLURALITY OF HISTORICAL USERS OF THE ELECTRONIC DOCUMENT PREPARATION SYSTEM, SECTIONS OF SOFTWARE INSTRUCTIONS EXECUTED FOR THE HISTORICAL USERS 606.

In one embodiment, at REQUEST CODE COVERAGE DATA INDICATING, FOR A PLURALITY OF HISTORICAL USERS OF THE ELECTRONIC DOCUMENT PREPARATION SYSTEM, SECTIONS OF SOFTWARE INSTRUCTIONS EXECUTED FOR THE HISTORICAL USERS 606, code coverage data is requested indicating, for a plurality of historical users of the electronic document preparation system, sections of software instructions executed for the historical users, using any of the methods, processes, and procedures discussed above with respect to FIGS. 1-3.

In one embodiment, once code coverage data is requested indicating, for a plurality of historical users of the electronic document preparation system, sections of software instructions executed for the historical users at REQUEST CODE COVERAGE DATA INDICATING, FOR A PLURALITY OF HISTORICAL USERS OF THE ELECTRONIC DOCUMENT PREPARATION SYSTEM, SECTIONS OF SOFTWARE INSTRUCTIONS EXECUTED FOR THE HISTORICAL USERS 606, process flow proceeds to GENERATE GROUPING DATA INCLUDING GROUPS OF HISTORICAL USERS BASED ON THE SECTIONS OF SOFTWARE INSTRUCTIONS EXECUTED FOR THE HISTORICAL USERS 608.

In one embodiment, at GENERATE GROUPING DATA INCLUDING GROUPS OF HISTORICAL USERS BASED ON THE SECTIONS OF SOFTWARE INSTRUCTIONS EXECUTED FOR THE HISTORICAL USERS 608, grouping data is generated including groups of historical users based on the sections of software instructions executed for the historical users, using any of the methods, processes, and procedures discussed above with respect to FIGS. 1-3.

In one embodiment, once grouping data is generated including groups of historical users based on the sections of software instructions executed for the historical users at GENERATE GROUPING DATA INCLUDING GROUPS OF HISTORICAL USERS BASED ON THE SECTIONS OF SOFTWARE INSTRUCTIONS EXECUTED FOR THE HISTORICAL USERS 608, process flow proceeds to GENERATE TRAINING SET DATA BY SAMPLING, FROM EACH GROUP IN THE GROUPING DATA, ONE OR MORE HISTORICAL USERS 610.

In one embodiment, at GENERATE TRAINING SET DATA BY SAMPLING, FROM EACH GROUP IN THE GROUPING DATA, ONE OR MORE HISTORICAL USERS 610, generate training set data by sampling, from each group in the grouping data, one or more historical users, using any of the methods, processes, and procedures discussed above with respect to FIGS. 1-3.

In one embodiment, once generate training set data by sampling, from each group in the grouping data, one or more historical users at GENERATE TRAINING SET DATA BY SAMPLING, FROM EACH GROUP IN THE GROUPING DATA, ONE OR MORE HISTORICAL USERS 610, process flow proceeds to END 612.

In one embodiment, at END 612 the process 600 for generating efficient training sets for testing new processes for preparing electronic documents for users of an electronic document preparation system is exited to await new data and/or instructions.

As noted, the specific illustrative examples discussed above are but illustrative examples of implementations of embodiments of the method or process for generating efficient training sets for testing new processes for preparing electronic documents for users of an electronic document preparation system. Those of skill in the art will readily recognize that other implementations and embodiments are possible. Therefore, the discussion above should not be construed as a limitation on the claims provided below.

In one embodiment, a system generates efficient training sets for testing new processes for preparing electronic documents for users of an electronic document preparation system. The system includes at least one processor at least one memory coupled to the at least one processor. The at least one memory has stored therein instructions which, when executed by any set of the one or more processors, perform a process including receiving new calculation data related to a new calculation for generating data values for preparing electronic documents for users of an electronic document preparation system. The process includes retrieving historical user data related to electronic documents previously prepared for a plurality of historical users and executing, for each of the historical users, prior code data corresponding to a previous version of the new calculation. The process includes generating, for each historical user, trace log data indicating sections of the prior code data that were executed for the historical users based on attributes of the historical user and generating grouping data including a plurality of groups of historical users based on sections of the prior code data executed for the historical users. The process includes generating training set data by sampling, from each group in the grouping data, one or more historical users.

One embodiment is a method for generating efficient training sets for testing new processes for preparing electronic documents for users of an electronic document preparation system. The method comprising receiving new calculation data related to a new calculation for preparing electronic documents for users of an electronic document preparation system and requesting code coverage data indicating, for a plurality of historical users of the electronic document preparation system, sections of software instructions executed for the historical users. The method includes generating grouping data including groups of historical users based on the sections of software instructions executed for the historical users and generating training set data by sampling, from each group in the grouping data, one or more historical users.

One embodiment is a method for generating efficient training sets for testing new processes for preparing electronic documents for users of an electronic document preparation system. The method includes receiving new calculation data related to a new calculation for generating data values for preparing electronic documents for users of an electronic document preparation system. The method includes retrieving historical user data including electronic documents previously prepared for a plurality of historical users and executing software instructions for preparing electronic documents with the historical user data. The method includes generating, for each historical user, trace log data indicating sections of the software instructions that were executed for the historical users and generating grouping data including a plurality of groups of historical users based on the sections of the software instructions executed for the historical users. The method includes generating training set data by sampling, from each group in the grouping data, one or more historical users.

In one embodiment, a computing system implemented method for generating efficient training sets for testing new processes for preparing electronic documents for users of an electronic document preparation system, includes receiving new calculation data related to a new calculation for generating data values for preparing electronic documents for users of an electronic document preparation system. The method includes retrieving historical user data including electronic documents previously prepared for a plurality of historical users. The method includes generating grouping data including a plurality of groups of historical users based on attributes of the historical users in the historical user data and including one or more groups selected based on rare combinations of attributes of the historical users. The method includes generating sampling data by selecting, from each group in the grouping data, one or more historical users. The method includes generating training set data including the historical user data associated with the historical users included in the sampling data.

In one embodiment, a system for generating efficient training sets for testing new processes for preparing electronic documents for users of an electronic document preparation system includes at least one processor and at least one memory coupled to the at least one processor. The at least one memory having stored therein instructions which, when executed by any set of the one or more processors, perform a process including receiving new calculation data related to a new calculation for preparing electronic documents for users of an electronic document preparation system and requesting code coverage data indicating, for a plurality of historical users of the electronic document preparation system, sections of software instructions executed for the historical users. The process includes generating grouping data including groups of historical users based on the sections of software instructions executed for the historical users and generating training set data by sampling, from each group in the grouping data, one or more historical users.

In one embodiment, a system for generating efficient training sets for testing new processes for preparing electronic documents for users of an electronic document preparation system includes at least one processor and at least one memory coupled to the at least one processor. The at least one memory having stored therein instructions which, when executed by any set of the one or more processors, perform a process including receiving new calculation data related to a new calculation for generating data values for preparing electronic documents for users of an electronic document preparation system. The process includes retrieving historical user data including electronic documents previously prepared for a plurality of historical users and executing software instructions for preparing electronic documents with the historical user data. The process includes generating, for each historical user, trace log data indicating sections of the software instructions that were executed for the historical users and generating grouping data including a plurality of groups of historical users based on the sections of the software instructions executed for the historical users. The process includes generating training set data by sampling, from each group in the grouping data, one or more historical users.

In the discussion above, certain aspects of one embodiment include process steps, operations, or instructions described herein for illustrative purposes in a particular order or grouping. However, the particular orders or groupings shown and discussed herein are illustrative only and not limiting. Those of skill in the art will recognize that other orders or groupings of the process steps, operations, and instructions are possible and, in some embodiments, one or more of the process steps, operations and instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

As discussed in more detail above, using the above embodiments, with little or no modification or input, there is considerable flexibility, adaptability, and opportunity for customization to meet the specific needs of various parties under numerous circumstances.

In the discussion above, certain aspects of one embodiment include process steps, operations, or instructions described herein for illustrative purposes in a particular order or grouping. However, the particular order or grouping shown and discussed herein are illustrative only and not limiting. Those of skill in the art will recognize that other orders and groupings of the process steps, operations, or instructions are possible and, in some embodiments, one or more of the process steps, operations, or instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or another device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for generating efficient training sets for testing new processes for preparing electronic documents for users of an electronic document preparation system, the system comprising:
   at least one processor; and
   at least one memory coupled to the at least one processor, the at least one memory having stored therein instructions which, when executed by any set of the one or more processors, perform a process including:

receiving new calculation data related to a new calculation for generating data values for preparing electronic documents for users of an electronic document preparation system;

retrieving historical user data related to electronic documents previously prepared for a plurality of historical users;

executing, for each of the historical users, prior code data corresponding to a previous version of the new calculation;

generating, for each historical user, trace log data indicating sections of the prior code data that were executed for the historical users based on attributes of the historical user;

generating grouping data including a plurality of groups of historical users based on sections of the prior code data executed for the historical users; and generating training set data by sampling, from each group in the grouping data, one or more historical users.

2. The system of claim 1, wherein the training set data includes the historical user data associated with the historical users sampled from the grouping data.

3. The system of claim 2, wherein the process further includes testing the new calculation data by executing the new calculation data for the training set data.

4. The system of claim 3, wherein the process further includes:
generating results data indicating results of testing the new calculation data; and
outputting the results data.

5. The system of claim 1, wherein the process includes generating the grouping data based on the sections of the prior code data executed for historical users in accordance with the trace log data.

6. The system of claim 5, wherein the process includes generating the grouping data by including a group for each unique combination of executed sections of the prior code data indicated in the trace log data.

7. The system of claim 1, wherein the process includes generating the trace log data with an instrumented run-time engine of a prior code execution and analysis module.

8. The system of claim 1, wherein the process further includes:
generating code coverage data based on the trace log data, the code coverage data indicating a portion of the prior code executed for the historical users; and
generating the grouping data based on the code coverage data.

9. The system of claim 1, wherein the electronic document preparation system is a tax return preparation system.

10. The system of claim 9, wherein the historical user data includes historical user tax related data, and wherein the previously prepared electronic documents are previously prepared tax returns.

11. The system of claim 10, wherein the calculation data includes a calculation for a tax related form associated with a tax return.

12. A method performed by one or more processors of a system, the method comprising:
receiving, from a database, a new calculation for preparing electronic documents for users of an electronic document preparation system;
requesting code coverage data indicating sections of software instructions executed for a plurality of historical users of the electronic document preparation system;
generating groups of historical users based on the sections of software instructions; and
generating training set data by sampling, from each group, one or more historical users.

13. The method of claim 12, wherein the training set data includes historical user data associated with the historical users selected in the sampling data.

14. The method of claim 12, further comprising receiving query data requesting the training set data for testing the new calculation, wherein requesting the code coverage data includes requesting the code coverage data in response to receiving the query data.

15. The method of claim 14, wherein requesting the code coverage data includes requesting the code coverage data from a third-party data services provider.

16. The method of claim 15, wherein requesting the code coverage data includes requesting a portion of the code coverage data based on the query data.

17. The method of claim 16, further comprising providing the code coverage data to the third-party data services provider prior to receiving the query data.

18. The method of claim 14, wherein requesting the code coverage data includes requesting the code coverage data from an internal database of the electronic document preparation system.

19. A method for generating efficient training sets for testing new processes for preparing electronic documents for users of an electronic document preparation system, the method comprising:
receiving new calculation data related to a new calculation for generating data values for preparing electronic documents for users of an electronic document preparation system;
retrieving historical user data including electronic documents previously prepared for a plurality of historical users;
executing software instructions for preparing electronic documents with the historical user data;
generating, for each historical user, trace log data indicating sections of the software instructions that were executed for the historical users;
generating grouping data including a plurality of groups of historical users based on the sections of the software instructions executed for the historical users; and
generating training set data by sampling, from each group in the grouping data, one or more historical users.

20. The method of claim 19, wherein the software instructions include a previous calculation corresponding to the new calculation.

21. The method of claim 19, further comprising generating code coverage data based on the trace log data, the code coverage data identifying the sections of the software code that were executed for each historical user.

22. The method of claim 21, wherein the code coverage data includes a table indicating the sections of the software instructions that were executed for a plurality of historical users.

23. The method of claim 22, wherein the table includes a matrix with rows corresponding to sections of the software instructions, columns corresponding to historical users, and data values indicating whether a software section was executed for a historical user.

24. The method of claim 23, wherein the matrix represents each historical user as a column vector with data values indicating which sections of the software instructions were executed for the historical user.

25. The method of claim 24, further comprising generating the grouping data by grouping identical column vectors.

26. The method of claim 24, further comprising generating, for each historical user, a respective hash value by applying a hash function to the column vector representing the historical user.

27. The method of claim 26, further comprising generating the grouping data by grouping identical hash values.

28. The method of claim 19, wherein the grouping data includes a group for each unique combination of software sections executed for the historical users.

29. The method of claim 19, wherein one or more of the groups includes only a single historical user.

30. The method of claim 19, wherein the sampling data includes only a single user from one or more of the groups.

31. The method of claim 19, wherein the electronic document preparation system is a tax return preparation system.

32. The method of claim 31, wherein the historical user data includes historical user tax related data, and wherein the previously prepared electronic documents are previously prepared tax returns.

33. The method of claim 32, wherein the new calculation data includes a calculation for a tax related form associated with a tax return.

34. The method of claim 19, wherein the method further includes testing the new calculation data by executing the new calculation data for the training set data.

35. The method of claim 34, further comprising:
generating results data indicating results of testing the new calculation data; and
outputting the results data.

36. A system comprising:
at least one processor; and
at least one memory storing instructions that, when executed by the at least one processor, cause the system to:
receive, from a database, a new calculation for preparing electronic documents for users of an electronic document preparation system;
request code coverage data indicating sections of software instructions executed for a plurality of historical users of the electronic document preparation system;
generate groups of historical users based on the sections of software instructions; and
generate training set data by sampling, from each group, one or more historical users.

37. The system of claim 36, wherein trace log data identifies a data value provided or returned for a section of the software instructions executed for one or more of the historical users and wherein the groups are generated based in part on the data value.

38. The system of claim 36, wherein trace log data identifies, and the groups are generated based on, one or more of:
a sign of a data value provided or returned for a section of the software instructions executed for one or more of the historical users;
whether a result of a less than or equal to statement in the software instructions is true for being less than or true for being equal;
whether a result of a greater than or equal to statement in the software instructions is true for being greater than or true for being equal;
whether a data value was negative before being passed through an absolute value operator in the software instructions;
whether a result of a Boolean expression in the software instructions is true or false;
which variable from a group of variables passed through a minimum operator in the software instructions had the smaller data value; and
which variable from a group of variables passed through a maximum operator in the software instructions had the larger data value.

39. The system of claim 36, wherein trace log data identifies whether a result of a less than or equal to statement in the software instructions is true for being less than or true for being equal.

40. The system of claim 36, wherein trace log data identifies whether a result of a greater than or equal to statement in the software instructions is true for being greater than or true for being equal.

41. A system for generating efficient training sets for testing new processes for preparing electronic documents for users of an electronic document preparation system, the system comprising:
at least one processor; and
at least one memory coupled to the at least one processor, the at least one memory having stored therein instructions which, when executed by any set of the one or more processors, perform a process including:
receiving new calculation data related to a new calculation for generating data values for preparing electronic documents for users of an electronic document preparation system;
retrieving historical user data including electronic documents previously prepared for a plurality of historical users;
executing software instructions for preparing electronic documents with the historical user data;
generating, for each historical user, trace log data indicating sections of the software instructions that were executed for the historical users;
generating grouping data including a plurality of groups of historical users based on the sections of the software instructions executed for the historical users; and
generating training set data by sampling, from each group in the grouping data, one or more historical users.

42. The system of claim 41, wherein the software instructions include a previous calculation corresponding to the new calculation.

43. The system of claim 41, further comprising generating code coverage data based on the trace log data, the code coverage data identifying the sections of the software code that were executed for each historical user.

44. The system of claim 43, wherein the code coverage data includes a table indicating the sections of the software instructions that were executed for a plurality of historical users.

45. The system of claim 44, wherein the table includes a matrix with rows corresponding to sections of the software instructions, columns corresponding to historical users, and data values indicating whether a software section was executed for a historical user.

46. The system of claim 45, wherein the matrix represents each historical user as a column vector with data values indicating which sections of the software instructions were executed for the historical user.

47. The system of claim 46, wherein the process further includes generating the grouping data by grouping identical column vectors.

48. The system of claim 46, wherein the process further includes generating, for each historical user, a respective hash value by applying a hash function to the column vector representing the historical user.

49. The system of claim 48, wherein the process further includes generating the grouping data by grouping identical hash values.

50. The system of claim 41, wherein the grouping data includes a group for each unique combination of software sections executed for the historical users.

51. The system of claim 41, wherein one or more of the groups includes only a single historical user.

52. The system of claim 41, wherein the sampling data includes only a single user from one or more of the groups.

53. The system of claim 41, wherein the electronic document preparation system is a tax return preparation system.

54. The system of claim 53, wherein the historical user data includes historical user tax related data, and wherein the previously prepared electronic documents are previously prepared tax returns.

55. The system of claim 54, wherein the new calculation data includes a calculation for a tax related form associated with a tax return.

56. The system of claim 41, wherein the system further includes testing the new calculation data by executing the new calculation data for the training set data.

57. The system of claim 56, wherein the process further includes:
generating results data indicating results of testing the new calculation data; and
outputting the results data.

58. The system of claim 41, wherein the sampling data includes multiple historical users from one or more of the groups.

* * * * *